No. 828,019. PATENTED AUG. 7, 1906.
T. CRONIN.
NUT LOCK.
APPLICATION FILED JULY 31, 1905.
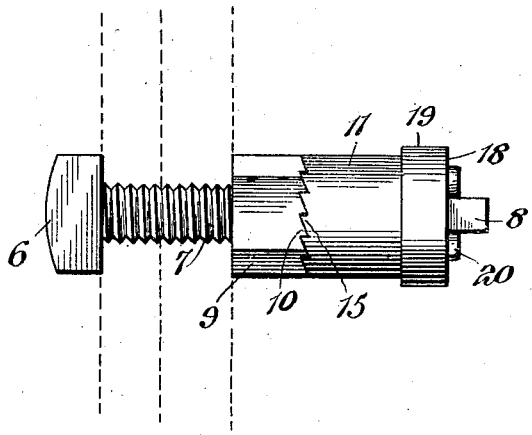
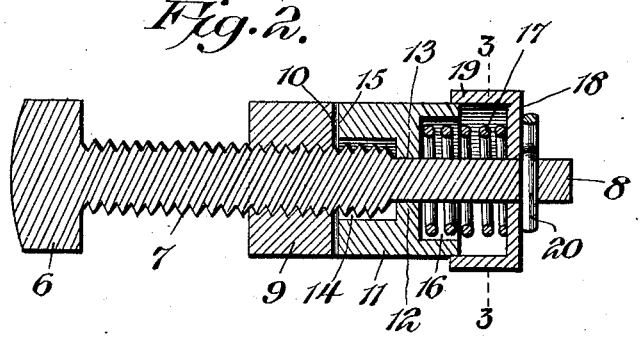
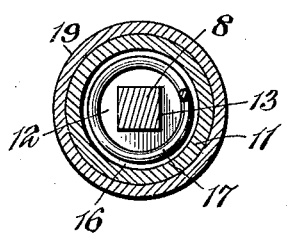
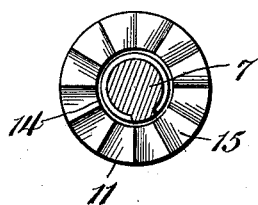
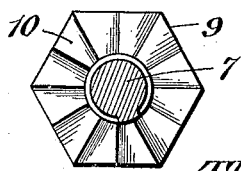
Witnesses
Howard D. Orr
B. G. Forth
Inventor,
Thomas Cronin,
By E. G. Siggers
Attorney

UNITED STATES PATENT OFFICE.

THOMAS CRONIN, OF MARIETTA, OHIO.

NUT-LOCK.

No. 828,019.  Specification of Letters Patent.  Patented Aug. 7, 1906.

Application filed July 31, 1905. Serial No. 272,078.

*To all whom it may concern:*

Be it known that I, THOMAS CRONIN, a citizen of the United States, residing at Marietta, in the county of Washington and State of Ohio, have invented a new and useful Nut-Lock, of which the following is a specification.

This invention relates to means for locking nuts upon bolts and the like.

The principal object is to provide a novel device of a simple nature that will efficiently and positively hold a nut against retrograde or loosening movement, will permit the tightening of the nut at any time, and will automatically relock the same after such tightening, can be taken off, if desired, so that it may be used repeatedly, and does not destroy or deleteriously affect the bolt or the threads thereof.

One embodiment of the invention is illustrated in the accompanying drawings, wherein—

Figure 1 is a side elevation of the nut-lock. Fig. 2 is a longitudinal sectional view through the same on an enlarged scale. Fig. 3 is a cross-sectional view on the line 3 3 of Fig. 2. Fig. 4 is a cross-sectional view through the bolt, showing the holding device in elevation. Fig. 5 is a similar view in an opposite direction, showing the outer end of the nut in elevation.

Similar reference-numerals designate corresponding parts in all the figures of the drawings.

In the embodiment illustrated a bolt is employed comprising a shank having a head 6, a threaded portion 7, and an outer portion 8, that is angular in cross-section, as shown in Fig. 3. The precise construction of the bolt, and more particularly the inner end thereof, is unimportant, as the improvement may be employed on bolts of various characters. Screwed upon the threaded portion 7 is a nut 9, provided with a radial series of teeth 10 on its outer side. It will be observed that the angular portion of the shank is considerably smaller in cross-sectional area than the threaded portion, so that the nut may be passed freely over such angular portion and screwed upon the threaded portion. Slidably mounted upon said angular portion is a holding device consisting of a cylindrical shell 11, having a transverse partition 12, provided with an angular opening 13, that slidably receives the angular portion 8 of the shank, and thus prevents the rotation of said holding device upon the shank. The bore 14 is of sufficient diameter to receive the threads of the shank, and the inner end of said holding device has a series of radial teeth 15, which are arranged to detachably interlock with the teeth 10 of the nut. The outer portion of the holding device defines a seat 16, that receives the inner end of a coiled spring 17, bearing against the partition 12. The outer end of said spring bears against a cap 18, mounted upon the angular portion of the shank and having an annular wall 19, that overlaps the outer end of the holding device, and thus slidably receives the same. The cap constitutes a casing which incloses the outer portion of the spring, as will be evident by reference to Fig. 2. This cap is held in place by a split key 20 or other suitable fastener passed through the outer end of the shank, and thus maintaining the parts in assembled condition.

In applying the structure to the articles to be held the shank is passed through said articles or the articles are placed upon the shank and the nut is then screwed upon the threaded portion until it properly binds against the adjacent side of the article. The holding device is then slipped upon the angular portion, the spring placed against said holding device, and the cap then fastened in position. It will be clear that the holding device will be held against turning movement, and the teeth 15 thereof interlocking with the teeth 10 will prevent the retrograde rotation of the nut. However, if it is desired to tighten the nut a wrench can be readily applied thereto, and when said nut is turned in the proper direction the teeth 10 will underride the teeth 15, whereupon the holding device will be forced back against the tension of the spring, and said nut can be readily rotated. The teeth, however, will immediately interlock again, and thus automatically refasten the nut against retrograde movement. To remove the nut it is only necessary to remove the holding means therefor, and this can be readily accomplished by taking out the split key, whereupon the parts mounted on the angular portion of the shank can be detached, thus leaving the nuts free. This structure will thus securely hold a nut in place, will not injure or strain the bolt, and can be easily and cheaply manufactured. It is of course very desirable in places where the jar or vibration will cause the loosening of the nut; but its use is not limited, as it may be employed in connection with nuts and bolts of various types and characters.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a nut-lock, the combination with a shank having a threaded portion and an angular portion, of a nut screwed upon the threaded portion, a holding device slidably mounted on the angular portion and having a detachable interlocking engagement with the nut, said device being held against rotation by the angular portion, a cap also mounted on the angular portion and held against rotation thereon, means for securing the cap against detachment from the shank, and a coiled spring surrounding the angular portion and interposed between the holding device and cap.

2. In a nut-lock, the combination with a shank having a threaded portion, of a nut screwed upon the threaded portion, a holding device slidably mounted on the shank and having a detachable interlocking engagement with the nut, means for yieldingly maintaining the holding device in such interlocking engagement, and a casing secured to the shank and constituting an abutment for and a casing that incloses said yielding means, said casing and holding device being disposed in overlapping relation, and the latter having a sliding movement with respect to the former.

3. In a nut-lock, the combination with a shank having a threaded portion, of a nut screwed upon the threaded portion and having teeth on its outer side, a holding device slidably mounted on the shank outside the nut and having teeth on its inner side that interlock with the teeth of the nut, a cap mounted on the outer end of the shank and comprising a casing overlapping the holding device, said device having a sliding movement within the casing, and a spring coiled about the shank and interposed between the cap and holding device, said spring being inclosed by the cap.

4. In a nut-lock, the combination with a shank, of a nut threaded thereon, a holding device slidably mounted on the shank and having an interlocking engagement with the nut, said device having an outstanding annular wall, a cap held on the shank outside the holding device and having an inwardly-extending annular wall overlapping the outstanding wall of the holding device, and a spring inclosed by the overlapping walls and bearing against the cap and holding device, said spring urging the latter into its said interlocking engagement with the nut.

5. In a nut-lock, the combination with a shank having a threaded portion and an angular outer portion, of a nut screwed upon the threaded portion and having teeth on its outer side, a holding device having an intermediate partition provided with an angular opening that slidably receives the angular portion of the shank, the inner portion of said holding device overlapping the threaded portion of the shank and being provided with teeth that interlock with the teeth of the nut, the outer portion of said holding device defining a seat, a cap detachably mounted on the outer end of the shank and having an annular wall that ovelaps the outer portion of the holding device, and a coiled spring interposed between the cap and holding device, the inner end of said spring being located in the seat and bearing against the partition of said holding device.

In testimony that I claim the foregoing as my own I have hereto affixed my signature in the presence of two witnesses.

THOMAS CRONIN.

Witnesses:
M. L. COFFIN,
E. W. BURKET.